(12) United States Patent
Gu et al.

(10) Patent No.: US 7,221,108 B2
(45) Date of Patent: May 22, 2007

(54) APPARATUS OF DRIVING LAMP AND LIQUID CRYSTAL DISPLAY DEVICE USING THE SAME

(75) Inventors: Seung Man Gu, Kyoungsangbuk-do (KR); Jong Ki An, Daegu (KR); Sung Yong Park, Kyoungsangnam-do (KR)

(73) Assignee: LG.Philips LCD.Co., Ltd., Seoul (KR)

( * ) Notice: Subject to any disclaimer, the term of this patent is extended or adjusted under 35 U.S.C. 154(b) by 306 days.

(21) Appl. No.: 10/963,584

(22) Filed: Oct. 14, 2004

(65) Prior Publication Data

US 2005/0099139 A1    May 12, 2005

(30) Foreign Application Priority Data

Nov. 12, 2003   (KR)  .................. 10-2003-0079768

(51) Int. Cl.
*H05B 37/00* (2006.01)

(52) U.S. Cl. .............. 315/312; 315/291; 315/224; 345/102

(58) Field of Classification Search .......... 315/224, 315/291, 209 R, 307–308, 312, 326, 169.3; 345/76, 87, 102

See application file for complete search history.

(56) References Cited

U.S. PATENT DOCUMENTS 6,960,891 B2 * 11/2005 Park et al. ................. 315/229

| | | | |
|---|---|---|---|
| 2002/0130628 A1 * | 9/2002 | Shin | 315/312 |
| 2004/0056830 A1 * | 3/2004 | Lee et al. | 345/87 |
| 2004/0232853 A1 * | 11/2004 | Hur et al. | 315/291 |
| 2005/0062436 A1 * | 3/2005 | Jin | 315/244 |
| 2005/0285549 A1 * | 12/2005 | Moon | 315/312 |
| 2006/0208998 A1 * | 9/2006 | Okishiro et al. | 345/102 |

FOREIGN PATENT DOCUMENTS

| JP | 05-72530 | 3/1993 |
|---|---|---|
| KR | 10-0402370 | 7/2003 |

* cited by examiner

*Primary Examiner*—Hoanganh Le
*Assistant Examiner*—Tung Le
(74) *Attorney, Agent, or Firm*—Morgan, Lewis & Bockius LLP

(57) ABSTRACT

An apparatus of driving a lamp includes a first inverter board having a first inverter for supplying a first high-voltage alternating-current waveform via a first high-voltage line to a first electrode of the lamp, and a second inverter board having a second inverter for supplying a second high-voltage alternating-current waveform via a second high-voltage line to a second electrode of the lamp, the second inverter being different from the first inverter.

19 Claims, 8 Drawing Sheets

Ton   Toff
    T

APPARATUS OF DRIVING LAMP AND LIQUID CRYSTAL DISPLAY DEVICE USING THE SAME

The present application claims the benefit of Korean Patent Application No. P2003-79768 filed in Korea on Nov. 12, 2003, which is hereby incorporated by reference.

BACKGROUND OF THE INVENTION

1. Field of the Invention

The present invention relates to a liquid crystal display device, and more particularly, to an apparatus of driving a lamp and a liquid crystal display device using the same that provide a uniform brightness in the device.

2. Discussion of the Related Art

LCD devices have been actively developed as flat display panels in laptop computers, desktop computers, and large-sized information displays because of their high quality image, lightness, thin thickness, compact size, and low power consumption. Most LCDs are passive devices in which images are displayed by controlling an amount of light input from an outside light source. Thus, a separate light source (back light unit) is generally employed for irradiating an LCD device.

In general, a halogen cathode fluorescent tube or a cold cathode fluorescent lamp (hereinafter, referred to as a "CCFL") is used as the light source in the back light unit. The CCFL is a light source tube using a cold emission phenomenon (electrons are emitted due to a strong electric field applied to the surface of a cathode) and has a low heat generation, a high brightness, and a long life span. The CCFL is classified into a light guide system, a direct illumination system and a reflection plate system, and an appropriate light source tube system among them is adopted in accordance with the requirement of LCD device.

In addition, the light source is classified into an internal electrode fluorescent lamp in which electrodes are formed inside of a discharge tube and an external electrode fluorescent lamp in which the electrodes are formed inside of the discharge tube. The fluorescent lamps are driven by a high-voltage alternating-current waveform. For example, after a direct-current (DC) power source supplied from a direct-current power source part is converted into an alternating-current waveform by an inverter, the high-voltage alternating-current (AC) waveform for driving the fluorescent lamps is boosted by a transformer.

Figure 1:
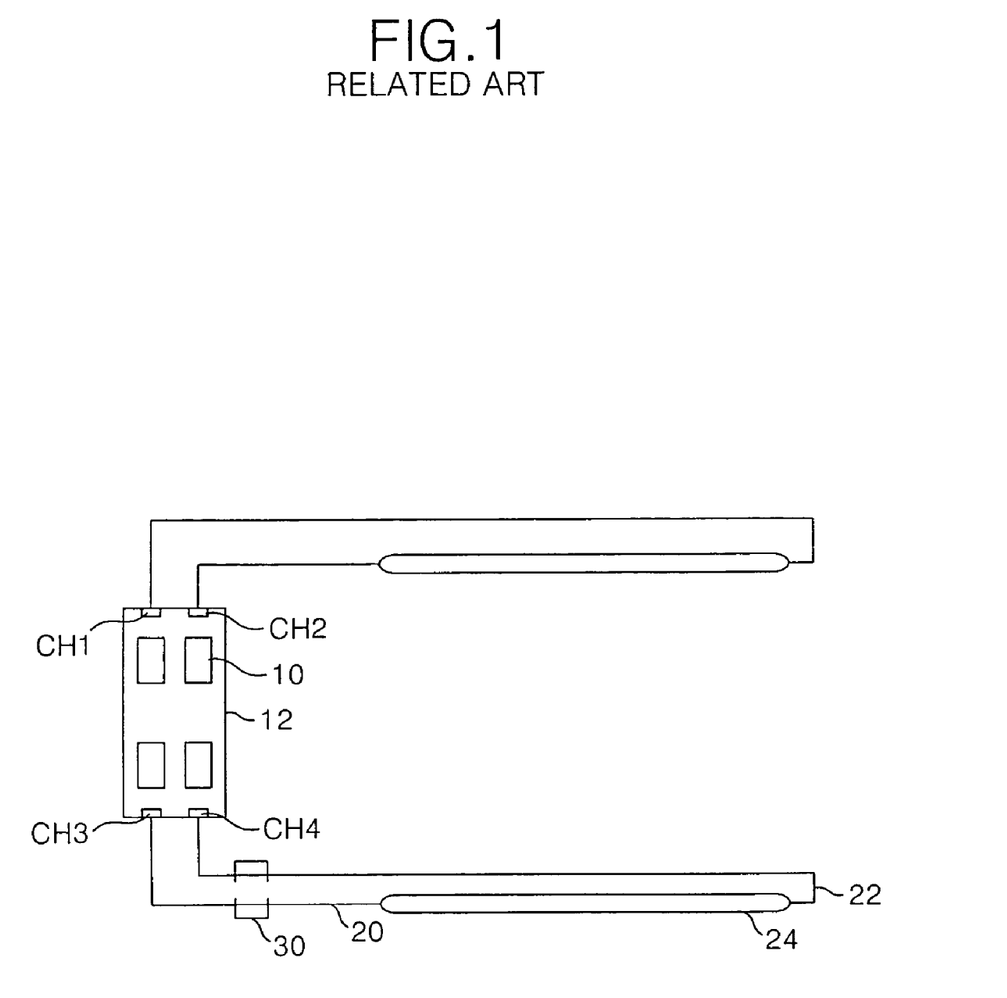
FIG. 1 is a schematic view of an apparatus of driving a lamp according to the related art.

FIG. 1 is a schematic view of an apparatus of driving a lamp according to the related art. In FIG. 1, an apparatus of driving a lamp includes lamps 24 for generating light and an inverter board 12 for driving the lamps 24. Each of the lamps 24 includes a glass tube having inert gases filled therein, and a first electrode and a second electrode at the opposite ends of the glass tube. An inner wall of the glass tube is coated with phosphor. When an AC waveform from the inverter board 12 is applied to the first and the second electrodes, electrons are emitted. These emitted electrons collide with the inert gases contained in the glass tube, and the number of electrons exponentially grows. These increased electrons generate electric currents in the glass tube, and excite the inert gases to emit ultraviolet rays. These ultraviolet rays collide with the phosphor coated on the inner wall of the glass tube, and generate visible lights.

The inverter board 12 generates a high-voltage AC waveform and supply the high-voltage AC waveform via a high-voltage line to first and second electrodes of the lamps 24. In particular, the inverter board 12 includes a plurality of inverters 10. Each of the inverters 10 includes an inverter integrated circuit converting a DC power source supplied from an exterior into an AC power source, and a transformer converting the AC power source from the inverter integrated circuit into the high-voltage AC waveform. Then, the high-voltage AC waveforms are outputted via a plurality of output channels CH1 to CH4 to the lamps 24.

For example, the first and the second channels CH1 and CH2 supply the high-voltage AC waveform to the first and the second electrodes of a first lamp 24. The third and the fourth channels CH3 and CH4 also supply the high-voltage AC waveform to the first and the second electrodes of a second lamp 24. A first high-voltage line 22 connected to the first electrode of the lamps 24 is connected to each of the first and the fourth output channels CH1 and CH4, and a second high-voltage line 20 connected to the second electrode of the lamps 24 is connected to each of the second and the third output channels CH2 and CH3.

Because a length of the first high-voltage line 22 is larger than a length of the second high-voltage line 20, an impedance difference between the first high-voltage line 22 and the second high-voltage line 20 is generated. Thus, a deviation of currents and voltages outputted form the inverter board 12 occurs due to the impedance difference between the first and the second high-voltage lines 22 and 20. As a result, a deviation in panel brightness is generated, to thereby induce an uneven brightness phenomenon in the panel.

Figure 2:
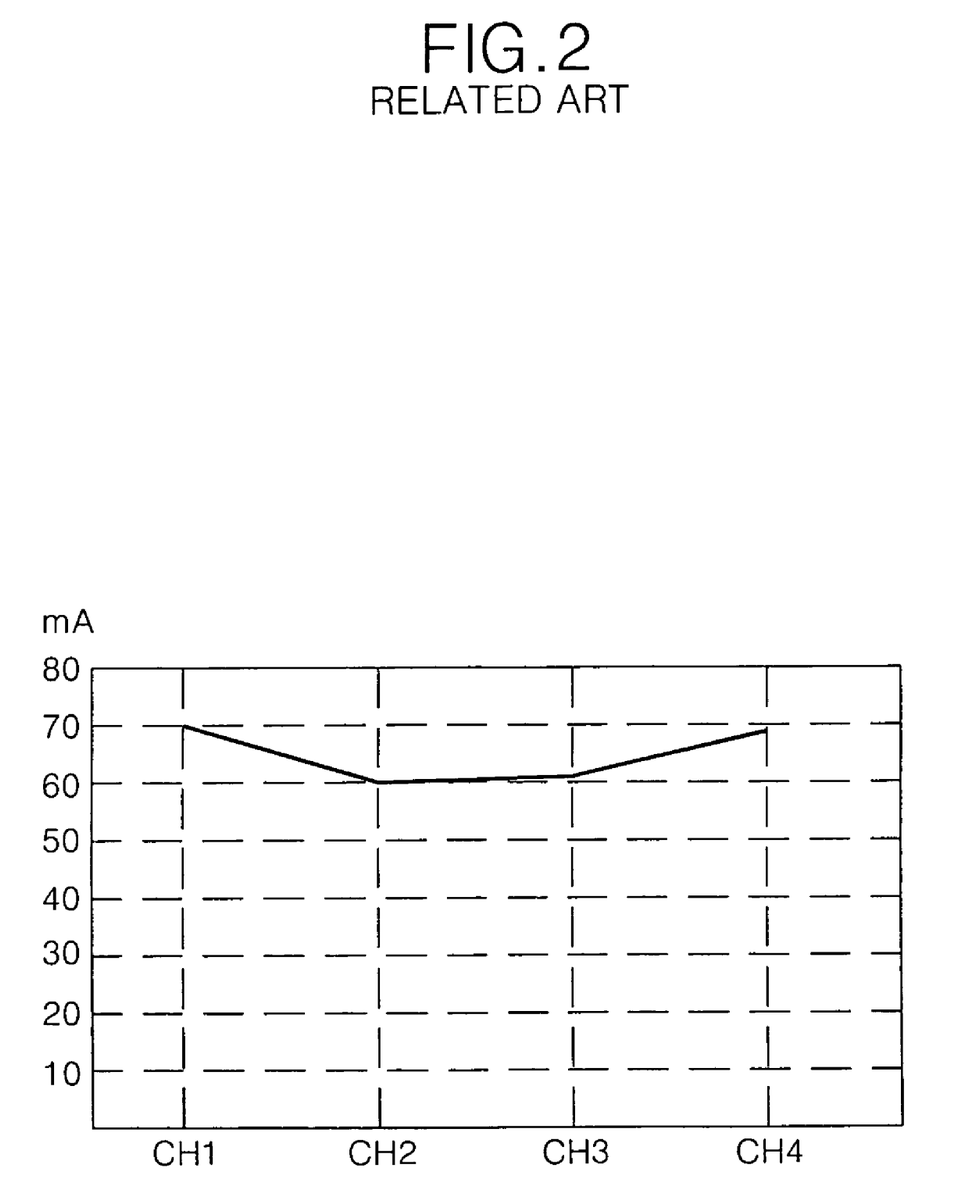
FIG. 2 is a graph showing a current deviation caused by a high-voltage line shown in FIG. 1.
Figure 3:
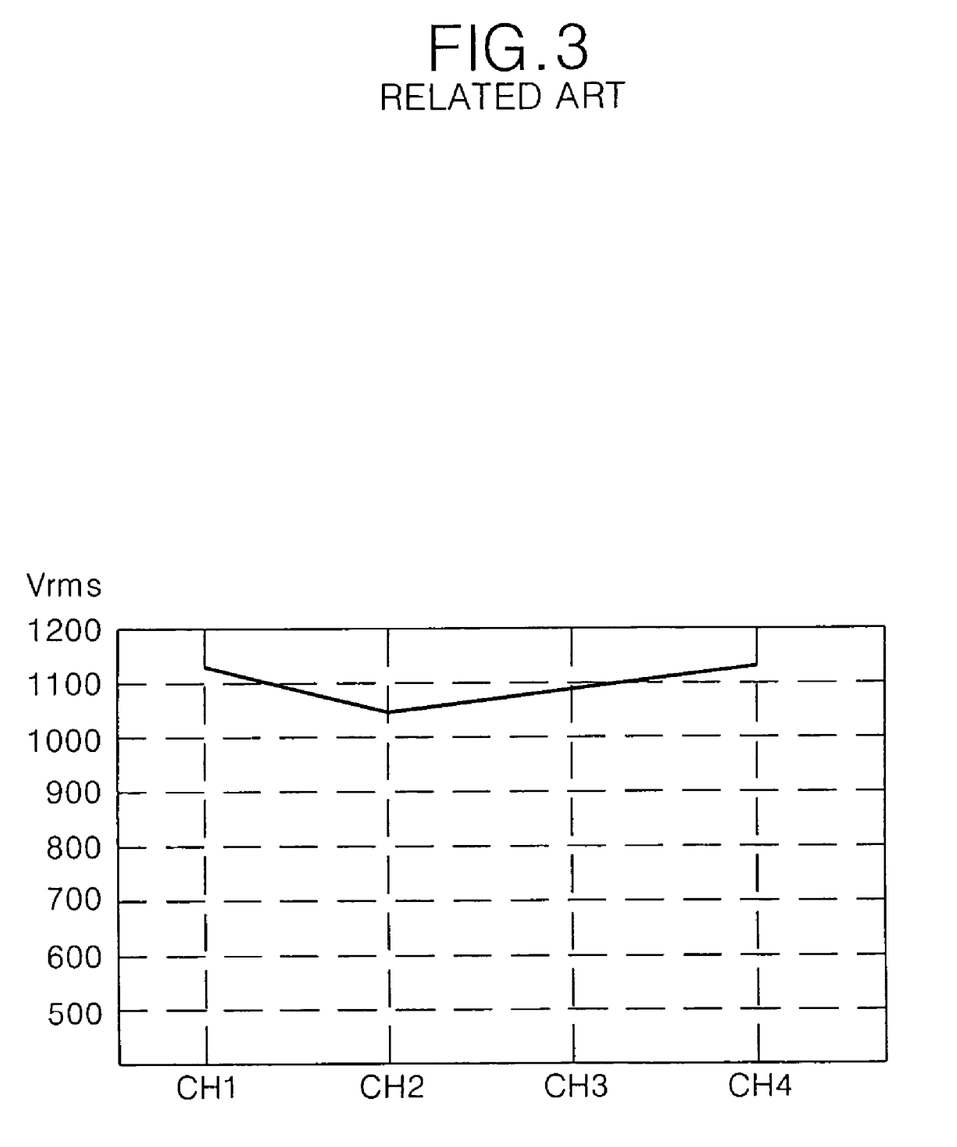
FIG. 3 is a graph showing a voltage deviation caused by the high-voltage line shown in FIG. 1.

FIG. 2 is a graph showing a current deviation caused by a high-voltage line shown in FIG. 1, and FIG. 3 is a graph showing a voltage deviation caused by the high-voltage line shown in FIG. 1. FIG. 2 is a measurement of the currents flowing on the high-voltage lines 22 and 20 at a measurement location 30 apart by about 5 cm from the output channels CH1 to CH4 (shown in FIG. 1). As shown in FIG. 2, a current value of about 70 mA is measured on the first high-voltage line 22 connected to the first and the fourth output channels CH1 and CH4 having a relatively long length. A current value of about 60 mA is measured on the second high-voltage line 20 connected to the second and the third output channels CH2 and CH3 having a relatively short length. Although not shown, this current deviation increases between the high-voltage lines 20 and 22 increases as they locate further from the output channels CH1 to CH4 and closer to the lamps 24.

Further, as shown in FIG. 3, the voltages flowing on the high-voltage lines 22 and 20 measured at a measurement location 30 apart by about 5 cm from the output channels CH1 to CH4 (shown in FIG. 1) has also a deviation due to a length difference between the first and the second high-voltage lines 22 and 20.

Accordingly, a deviation of currents and voltages occurs in the AC waveforms supplied to drive the lamps 24, the first and second electrodes of each the lamps 24 receive different waveforms. As a result, a deviation in panel brightness is generated, to thereby induce an uneven brightness phenomenon in the panel.

SUMMARY OF THE INVENTION

Accordingly, the present invention is directed to an apparatus of driving a lamp and a liquid crystal display device using the same that substantially obviate one or more of the problems due to limitations and disadvantages of the related art.

An object of the present invention is to provide an apparatus of driving a lamp and a liquid crystal display device using the same capable of making an entire brightness uniform by making a length of a high-voltage line between inverters be the same to decrease a deviation of on output voltage and a current.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the apparatus of driving a lamp includes a first inverter board having a first inverter for supplying a first high-voltage alternating-current waveform via a first high-voltage line to a first electrode of the lamp, and a second inverter board having a second inverter for supplying a second high-voltage alternating-current waveform via a second high-voltage line to a second electrode of the lamp, the second inverter being different from the first inverter.

In another aspect, the apparatus for driving at least first and second lamps includes a first inverter board having a first inverter and a second inverter, the first inverter for supplying a first high-voltage alternating-current waveform via a first high-voltage line to a first electrode of the first lamp, and the second inverter for supplying a second high-voltage alternating-current waveform via a second high-voltage line to a first electrode of the second lamp, and a second inverter board having a third inverter and a fourth inverter, the third inverter for supplying a third high-voltage alternating-current waveform via a third high-voltage line to a second electrode of the first lamp, and the fourth inverter for supplying a fourth high-voltage alternating-current waveform via a fourth high-voltage line to a second electrode of the second lamp.

In yet another aspect, the liquid crystal display device includes a liquid crystal display module including a liquid crystal panel and a lamp, a first inverter board arranged along an edge of a first side on a rear surface of the liquid crystal display module and having a first inverter for supplying a first high-voltage alternating-current waveform to a first electrode of the lamp via a first high-voltage line, and a second inverter board arranged along an edge of a second side on the rear side of the liquid crystal display module and having a second inverter for supplying a second high-voltage alternating-current waveform to a second electrode of the lamp via a second high-voltage line, the second side of the liquid crystal display module being different from the first side.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 4:
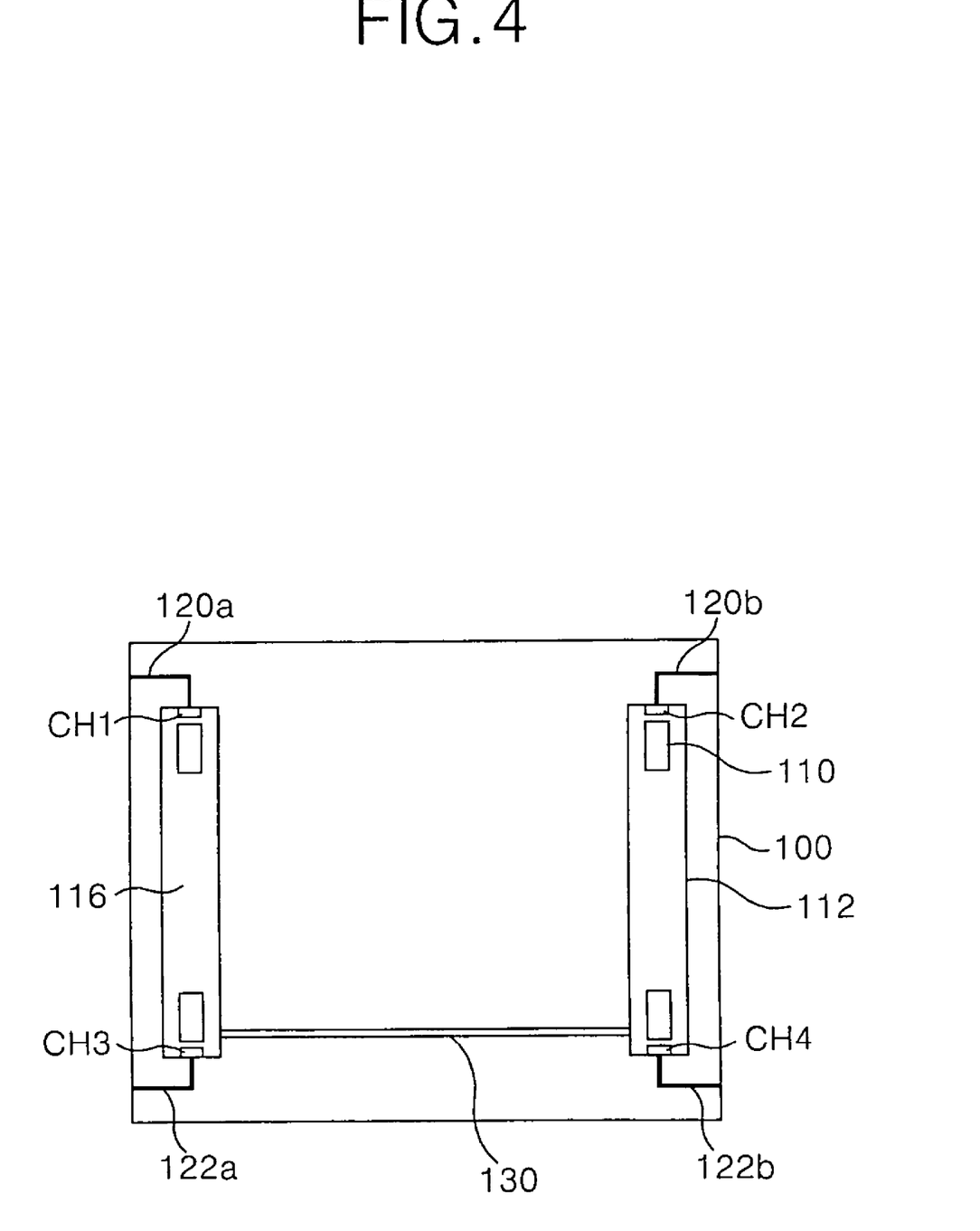
FIG. 4 is a rear surface view of an apparatus of driving a lamp for a liquid crystal display device according to an embodiment of the present invention.

FIG. 4 is a rear surface view of an apparatus of driving a lamp for a liquid crystal display device according to an embodiment of the present invention. In FIG. 4, a liquid crystal display device may include a liquid crystal display module 100, a first inverter board 116, a second inverter board 112, and a cable 130 for connecting the second inverter board 112 to the first inverter board 116. The first inverter board 116 may be along an edge of one side on a rear surface of the liquid crystal display module 100, and the second inverter board 112 may be along an edge of another side of the liquid crystal display module 100 opposite from the first invert board 116. The first and second inverter boards 116 and 112 may have inverters 114 and 110 and output channels CH1, CH2, CH3 and CH4. A plurality of high-voltage lines 120a, 120b, 122a and 122b may be connected to the first and second inverter boards 116 and 112 via the output channels CH1, CH2, CH3 and CH4, respectively. These high-voltage lines 120a, 120b, 122a and 122b may have the same length. Although not shown, the first and second inverter boards 116 and 112 may be placed other portions of the liquid crystal display module 100, e.g., on a side surface or a front surface of the liquid crystal display module 100.

Figure 5:
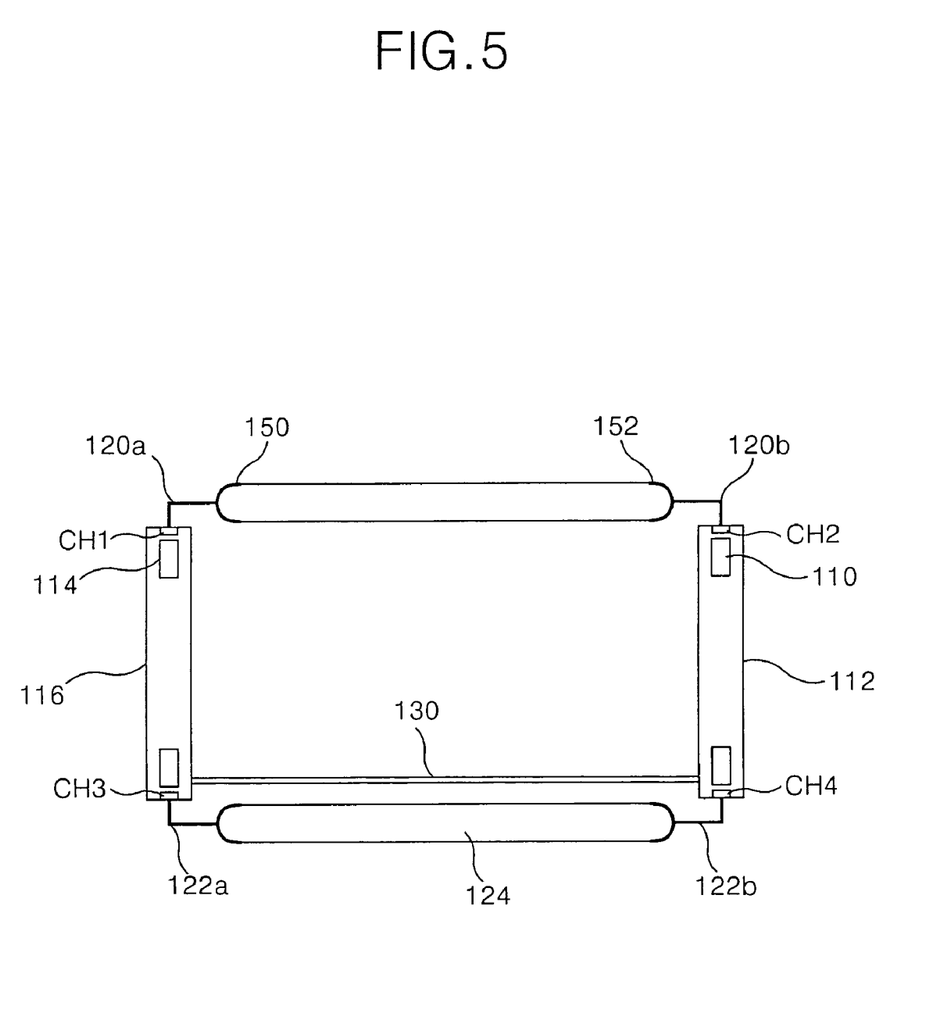
FIG. 5 is a schematic diagram showing the apparatus of FIG. 4 attached to a lamp.

As shown in FIG. 5, the liquid crystal display module 100 may include a back light unit having a plurality of lamps 124, a liquid crystal display panel arranged on the back light unit (not shown), and a frame accommodating the back light unit and the liquid crystal display panel (not shown). Although not shown, more than two of the lamps 124 may be included in the liquid crystal display module 100. In particular, these lamps 124 may be arranged parallel to each other in at least two groups. In particular, the back light unit may be classified into a direct-below-type back light unit and an edge-type back light unit depending on an arranged location of the lamps 124. In the edge-type back light unit, the lamps 124 may be arranged at one side or both sides of in a light guide plate for converting light incident to the light guide plate into a surface light. In the direct-below-type back light unit, the lamps 124 may be arranged in parallel on a rear surface of the liquid crystal display panel.

Each of the lamps 124 may include a glass tube having inert gases filled therein, and a first electrode 150 and a second electrode 152 installed at opposite ends of the glass tube, respectively. In addition, an inner wall of the glass tube may be coated with phosphor. The lamps 124 may be classified into internal electrode fluorescent lamps in which electrodes are formed inside of discharge tubes and external electrode fluorescent lamp in which the electrodes are formed inside of the discharge tubes. An example of the external electrode fluorescent lamp among the internal electrode fluorescent lamp and the external electrode fluorescent lamp will be described as follows.

The first electrode 150 may be connected to the first inverter board 116 via the high-voltage lines 120a and 122a, and the second electrode 152 may be connected to the second inverter board 112 via the high-voltage lines 120b and 122b. Each of the first and second inverter boards 116 and 112 may generate a high-voltage alternating-current (AC) waveform for driving the lamps 124. In particular, the first and second inverter board 116 and 112 may supply the high-voltage AC waveforms to the first and second electrodes 150 and 152 of the lamps 124 via the high-voltage lines 120a, 120b, 122a and 122b. When an AC waveform from each of the first and the second inverter board 116 and 112 is applied to each of the first and the second electrodes 150 and 152, electrons are emitted. These emitted electrons collide with the inert gases contained in the glass tube, and the number of electrons exponentially grows. These increased electrons generate electric currents in the glass tube, and excite the inert gases to emit ultraviolet rays. These ultraviolet rays collide with the phosphor coated on the inner wall of the glass tube to generate visible lights.

Figure 6:
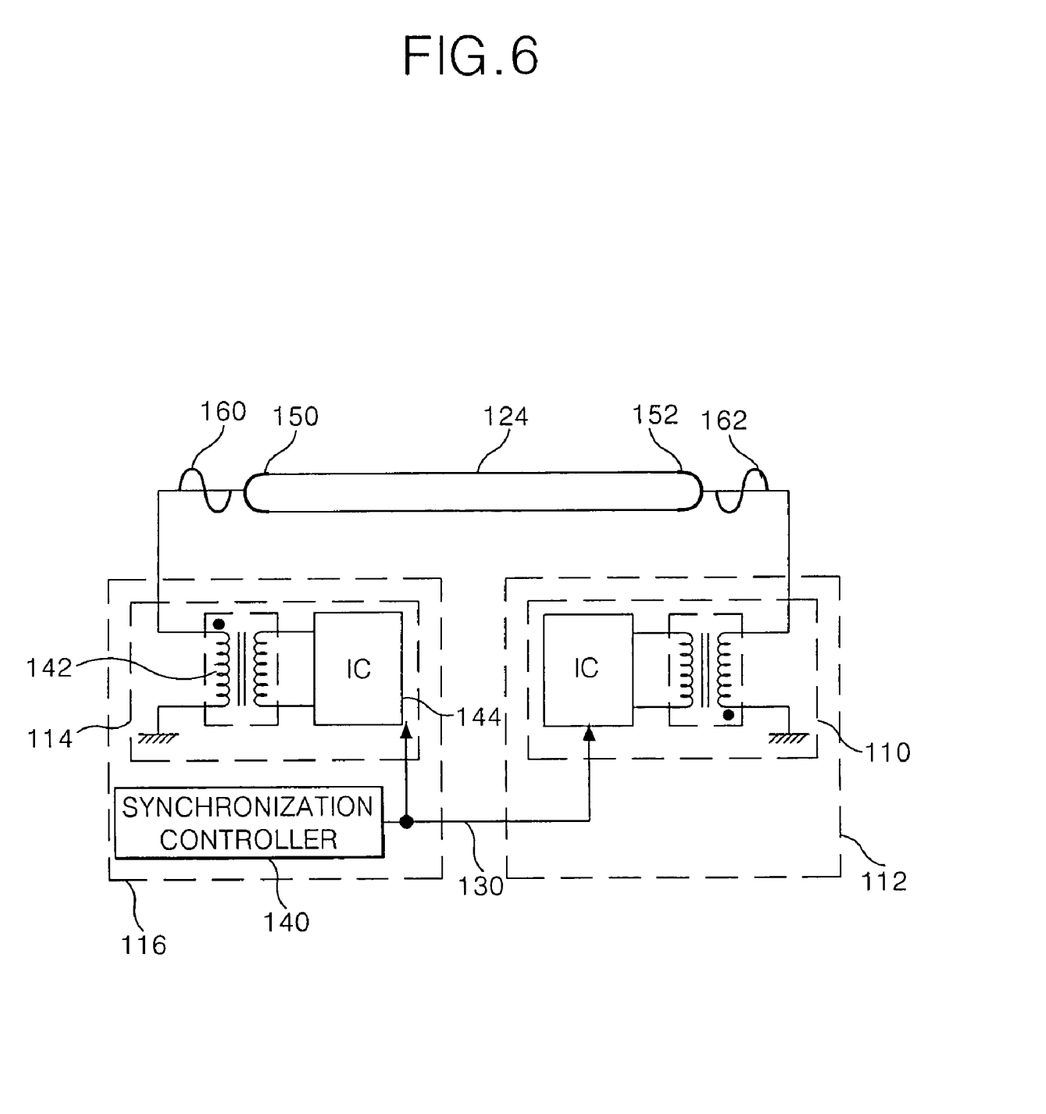
FIG. 6 is a circuit diagram illustrating the apparatus of driving the lamp shown in FIG. 5.

FIG. 6 is a circuit diagram illustrating the apparatus of driving the lamp shown in FIG. 5. As shown in FIG. 6, the first inverter board 116 may include a plurality of first inverters 114. Each of the first inverters 114 may include an inverter integrated circuit 144 for converting a DC power source supplied from an exterior power source device (not shown) into an AC power source and a transformer 142 for converting the AC power source from the inverter integrated circuit into a first high-voltage AC waveform 160 with a first phase. In addition, the second inverter board 112 may include a plurality of second inverters 110. Each of the second inverters 110 may include an inverter integrated circuit for converting a DC power source supplied from an exterior into an AC power source and a transformer for converting the AC power source from the inverter integrated circuit into a second high-voltage AC waveform 162 with a second phase different from the first phase.

A synchronization controller 140 may be installed in one of the first and the second inverter boards 116 and 112 to synchronize driving timings of the first inverters 114 and the second inverters 110. The synchronization controller 140 may generate a synchronization signal for synchronizing a driving timing of the first inverters 114 and a driving timing of the second inverters 110, and then may supply the generated synchronization signal to the first inverters 114 and the second inverters 110 via the cable 130. As a result, the driving timings of the first inverters 114 and the second inverters 110 may be synchronized with each other by the synchronization controller 140.

In addition, the integrated circuit 144 may convert the DC power source from the exterior into the AC waveform in response to the synchronization signal from the synchronization controller 140, to supply the converted AC waveform to the transformer 142. The transformer 142 then may convert the received AC waveform into the high-voltage AC waveform and supply the converted high-voltage AC waveform to the lamp 124. The converted high-voltage AC waveform may be outputted via the output channels CH1, CH2, CH3 and CH4. In particular, each of the first inverters 114 installed in the first inverter board 116 may supply the high-voltage AC waveform 160 having a positive phase to the first electrode 150 of the lamp 124. In addition, each of the second inverters 110 installed in the second inverter board 112 may supply the high-voltage AC waveform 162 having a reversed phase to the second electrode 152 of the lamp 124. Thus, the phase of the AC waveform 160 supplied to the first electrode 150 and the phase of the AC waveform 162 supplied to the second electrode 152 may have a phase difference of 180° with respect to each other.

Further, the output channels CH1 to CH4 provided in each of the first and the second inverter boards 116 and 112 may be connected, via the high-voltage lines 120a, 120b, 122a and 122b having the same length, to the electrodes 150 and 152 of each lamp 124. More specifically, the first inverter board 116 for supplying the high-voltage AC waveform 160 to the first electrode 150 of the lamp 124 may be arranged along the edge of one side of the rear surface of the liquid crystal display module 100 adjacent to the first electrode 150 of the lamp 124, and the second inverter board 112 for supplying the high-voltage AC waveform 162 to the second electrode 152 of the lamp 124 may be arranged along the edge of the other side on the rear surface of the liquid crystal display module 100 adjacent to the second electrode 152 of the lamp 124.

Since the lengths of the high-voltage lines 120a, 120b, 122a and 122b are the same, it is possible to decrease the deviation of an output electrical voltage and current due to the impedance difference of the high-voltage line as shown in the related art. Thus, in the apparatus of driving the lamp and the liquid crystal display device using the same according to an embodiment of the present invention, all of the impedances in the high-voltage lines 120a, 120b, 122a and 122b may be the same, to thereby decrease the deviation of the output electrical voltage and current. Therefore, a brightness deviation in the back light unit is uniform. Although the high-voltage lines 120a, 120b, 122a and 122b are shown to have the same length, the high-voltage line 120a may be different from the high-voltage line 122a, and the high-voltage line 120b may be different from the high-voltage line 122b. As long as the high-voltage lines 120a and 120b have the same length and the high-voltage lines 122a and 122b have the same length, the deviation of the output electrical voltage and current may still be decreased.

In addition, since the AC waveforms having the phase difference of about 180° are supplied to each of the first and the second electrode 150 and 152 of the respective lamps, a power consumption is reduced and a driving efficiency is improved.

Figure 7:
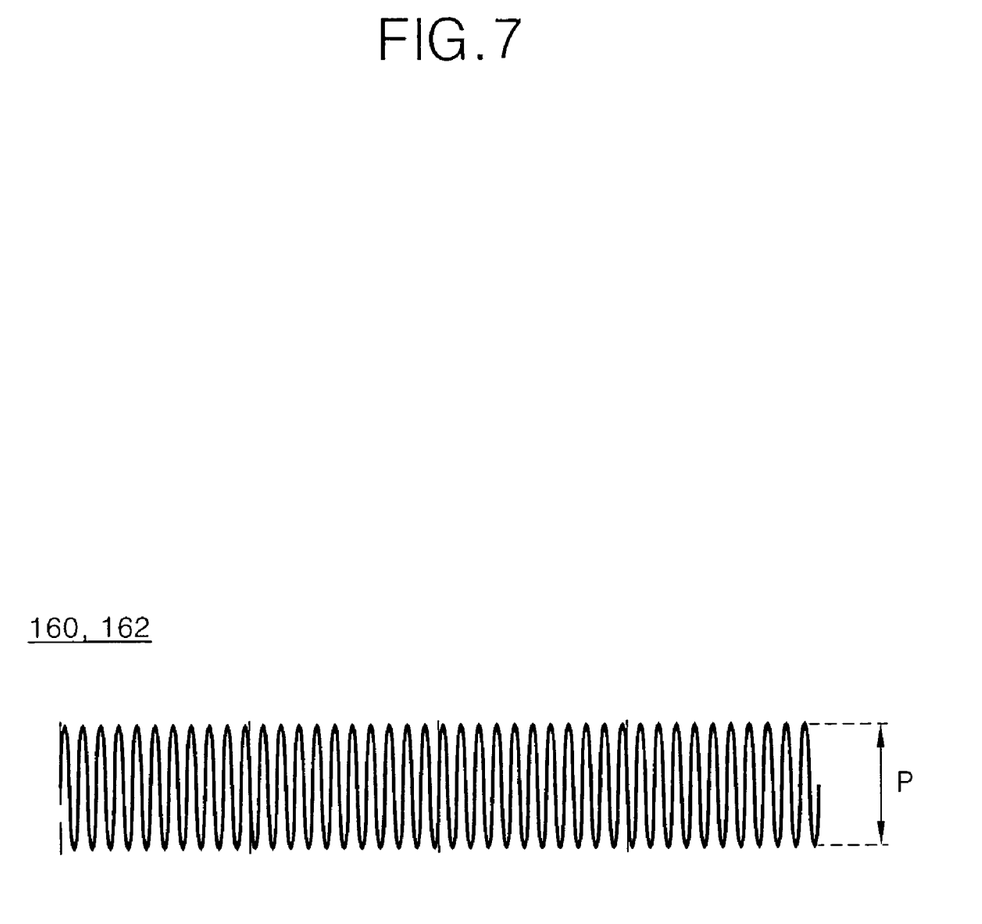
FIG. 7 is a waveform diagram illustrating an alternating-current waveform of an analog mode supplied to the lamp shown in FIG. 5.
Figure 8:
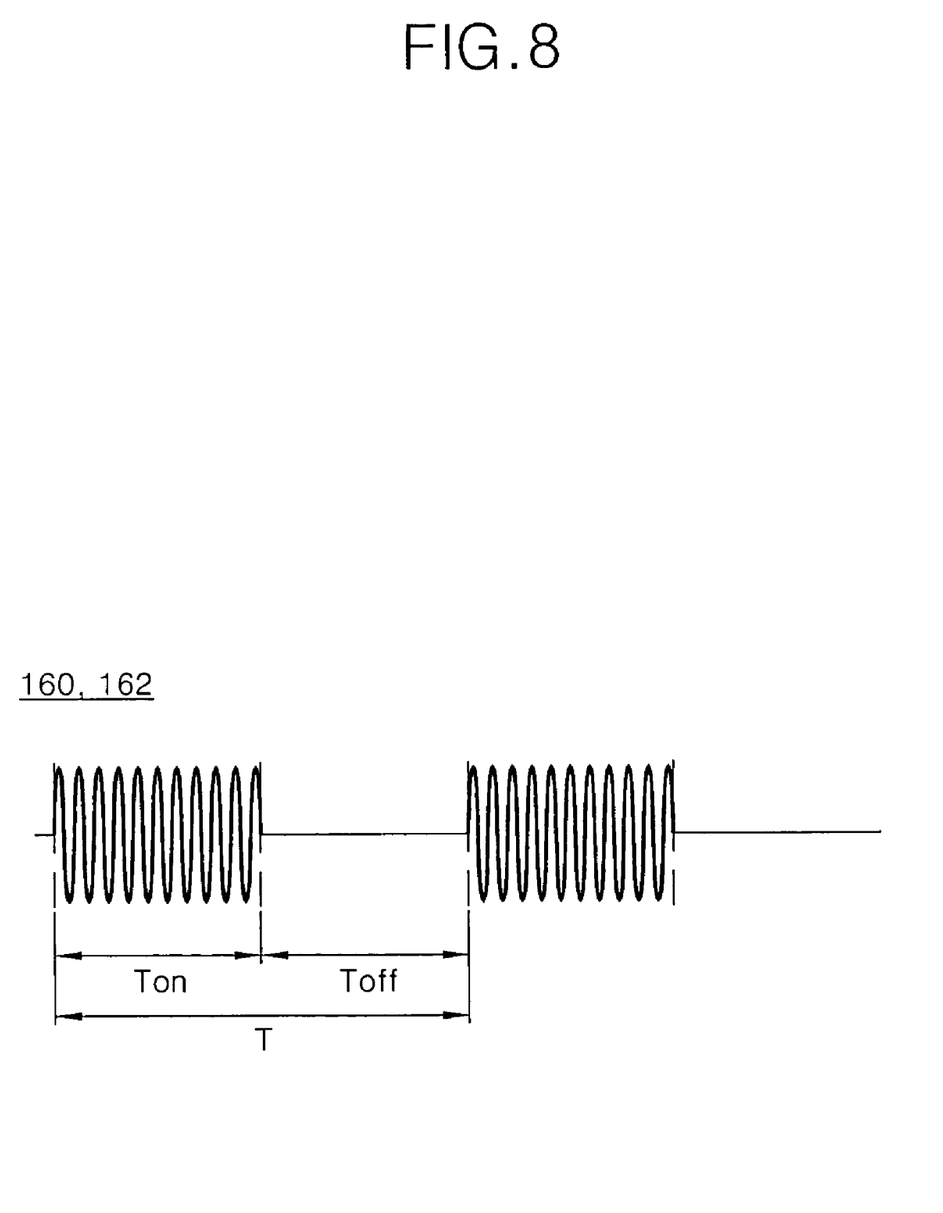
FIG. 8 is a waveform diagram illustrating an alternating-current waveform of a burst mode supplied to the lamp shown in FIG. 5.

FIG. 7 is a waveform diagram illustrating an alternating-current waveform of an analog mode supplied to the lamp shown in FIG. 5, and FIG. 8 is a waveform diagram illustrating an alternating-current waveform of a burst mode supplied to the lamp shown in FIG. 5. As shown in FIG. 7, the high-voltage AC waveforms 160 and 162 may be in an analog mode having an oscillating amplitude P for continually turning on the lamp 124. The high-voltage AC waveforms 160 and 162 may adjust the amplitude P, to thereby adjust a brightness of the lamp 124 (shown in FIG. 6). Alternatively, as shown in FIG. 8, the high-voltage AC waveforms 160 and 162 may be in a burst mode having a turning-on period Ton and a turning-off period Toff during each designated period T. The high-voltage AC waveforms 160 and 162 may have an oscillating amplitude only during the period of Ton and may adjust the brightness of the lamp 124 (shown in FIG. 6) by adjusting a time ratio of the turning-on period Ton and the turning-off period Toff to selectively turn on or off the lamp 124.

As described above, according to the apparatus of driving the lamp and the liquid crystal display device according to an embodiment of the present invention, the first and the second inverter boards may be arranged on the rear surface of the liquid crystal display device corresponding to each of the first and the second electrodes of the respective lamps and the lengths of the high-voltage lines are the same. Accordingly, the deviation of the impedance caused by the length difference in the high-voltage lines is minimized, and the deviation in the output voltage and the current of the AC waveform are minimized. As a result, the panel has uniform brightness. Further, the AC waveforms being respectively supplied to the first and the second electrodes of a lamp have a phase difference of about 180° with respect to each other. Thus, the power consumption is reduced and the driving efficiency is improved.

It will be apparent to those skilled in the art that various modifications and variations can be made in the apparatus of driving lamp and the liquid crystal display device using the same of the present invention without departing from the sprit or scope of the invention. Thus, it is intended that the present invention covers the modifications and variations of this invention provided they come within the scope of the appended claims and their equivalents.

What is claimed is:

1. An apparatus of driving a lamp, comprising:
   a first inverter board having a first inverter for supplying a first high-voltage alternating-current waveform via a first high-voltage line to a first electrode of the lamp; and
   a second inverter board having a second inverter for supplying a second high-voltage alternating-current waveform via a second high-voltage line to a second electrode of the lamp, the second inverter being different from the first inverter,
   wherein the apparatus includes a plurality of the lamps, the first inverter board includes a plurality of the first inverters, and the second inverter board includes a plurality of the second inverters, the first and second inverters respectively driving the plurality of the lamps.

2. The apparatus according to claim 1, further comprising:
   a synchronization controller for generating a synchronization signal to synchronize driving timings of the first inverter and the second inverter; and
   a cable, connected to the first inverter board and the second inverter board, for transmitting the synchronization signal to the first inverter and the second inverter.

3. The apparatus according to claim 1, wherein the first inverter includes:
   a first integrated circuit for converting a direct-current power source into an alternating-current waveform in response to the synchronization signal; and
   a first transformer for converting the alternating-current waveform from the integrated circuit into the first high-voltage alternating-current waveform having a first phase and supplying the converted alternating-current waveform to the first electrode via the first high-voltage line.

4. The apparatus according to claim 3, wherein the second inverter includes:
   a second integrated circuit for converting a direct-current power source into an alternating-current waveform in response to the synchronization signal; and
   a second transformer for converting the alternating-current waveform from the integrated circuit into the second high-voltage alternating-current waveform having a second phase and supplying the converted alternating-current waveform to the second electrode via the second high-voltage line.

5. The apparatus according to claim 4, wherein the first phase and the second phase have a phase difference of about 180 ÿ with respect to each other.

6. The apparatus according to claim 1, wherein the lamp is continually turned on.

7. The apparatus according to claim 1, wherein the lamp is alternatively turned on and off during one time period.

8. The apparatus according to claim 1, wherein lengths of the first and second high-voltage lines are substantially the same.

9. An apparatus for driving at least first and second lamps, comprising:
   a first inverter board having a first inverter and a second inverter, the first inverter for supplying a first high-voltage alternating-current waveform via a first high-voltage line to a first electrode of the first lamp, and the second inverter for supplying a second high-voltage alternating-current waveform via a second high-voltage line to a first electrode of the second lamp; and
   a second inverter board having a third inverter and a fourth inverter, the third inverter for supplying a third high-voltage alternating-current waveform via a third high-voltage line to a second electrode of the first lamp, and the fourth inverter for supplying a fourth high-voltage alternating-current waveform via a fourth high-voltage line to a second electrode of the second lamp.

10. The apparatus according to claim 9, wherein lengths of the first and third high-voltage lines being substantially the same, and wherein lengths of the second and fourth high-voltage lines being substantially the same.

11. The apparatus according to claim 9, further comprising:
    a synchronization controller for controlling driving timings of the first, second, third and fourth inverters; and
    a cable connecting the first inverter board and the second inverter board to the synchronization controller.

12. The apparatus according to claim 9, further comprising a plurality of the first lamps arranged in parallel to each other, and a plurality of the second lamps arranged in parallel to each other.

13. The apparatus according to claim 9, wherein the apparatus is included in a liquid crystal display module.

14. A liquid crystal display device, comprising:
    a liquid crystal display module including a liquid crystal panel and a lamp;
    a first inverter board arranged along an edge of a first side on a rear surface of the liquid crystal display module and having a first inverter for supplying a first high-voltage alternating- current waveform to a first electrode of the lamp via a first high-voltage line; and
    a second inverter board arranged along an edge of a second side on the rear side of the liquid crystal display module and having a second inverter for supplying a second high-voltage alternating-current waveform to a second electrode of the lamp via a second high-voltage line, the second side of the liquid crystal display module being different from the first side,
    wherein the device includes a plurality of the lamps, the first inverter board includes a plurality of the first inverters, and the second inverter board includes a plurality of the second inverters, the first and second inverters respectively driving the plurality of the lamps.

15. The liquid crystal display device according to claim 14, further comprising:

a synchronization controller, arranged on one of the first and second inverter boards, for generating a synchronization signal to synchronize driving timings of the first inverter and the second inverter; and a cable, connected to the first inverter board and the second inverter board, for transmitting the synchronization signal to the first inverter and the second inverter.

16. The liquid crystal display device according to claim 15, wherein the first inverter includes:

a first integrated circuit for converting a direct-current power source into an alternating-current waveform in response to the synchronization signal; and a first transformer for converting the alternating-current waveform from the first integrated circuit into the first high-voltage alternating-current waveform having a first phase and supplying the converted alternating-current waveform to the first electrode via the first high-voltage line.

17. The liquid crystal display device according to claim 16, wherein the second inverter includes:

a second integrated circuit for converting a direct-current power source into an alternating-current waveform in response to the synchronization signal; and a second transformer for converting the alternating-current waveform from the second integrated circuit into the second high-voltage alternating-current waveform having a second phase and supplying the converted alternating-current waveform to the second electrode via the second high-voltage line.

18. The liquid crystal display device according to claim 17, wherein the first phase and the second phase have a phase difference of about 180 ÿ with respect to each other.

19. The liquid crystal display device according to claim 14, wherein lengths of the first and second high-voltage lines are substantially the same.

* * * * *